(12) United States Patent
Bidkar et al.

(10) Patent No.: US 11,663,180 B2
(45) Date of Patent: May 30, 2023

(54) TRUSTED CONTROL AUTOMATION PLATFORM

(71) Applicant: Bank of America Corporation, Charlotte, NC (US)

(72) Inventors: Prashant Anna Bidkar, Delhi (IN); Madhusudhanan Krishnamoorthy, Chennai (IN); Sarvesh Neelakanta Subramani, Hyderabad (IN); Anjani Mishra, New Delhi (IN); Hitesh Chopra, Haryana (IN); Thenamudhan Arumugasamy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 274 days.

(21) Appl. No.: 17/140,006

(22) Filed: Jan. 1, 2021

(65) Prior Publication Data

US 2022/0215005 A1 Jul. 7, 2022

(51) Int. Cl.
| | |
|---|---|
| H04L 29/06 | (2006.01) |
| G06F 16/215 | (2019.01) |
| G06F 16/25 | (2019.01) |
| H04L 9/40 | (2022.01) |
| H04L 9/32 | (2006.01) |
| G06F 16/26 | (2019.01) |
| H04L 9/00 | (2022.01) |

(52) U.S. Cl.
CPC .......... *G06F 16/215* (2019.01); *G06F 16/258* (2019.01); *G06F 16/26* (2019.01); *H04L 9/3236* (2013.01); *H04L 63/0263* (2013.01); *H04L 9/50* (2022.05)

(58) Field of Classification Search
CPC ...... G06F 16/215; G06F 16/258; G06F 16/26; H04L 9/3236; H04L 63/0263; H04L 9/50
See application file for complete search history.

(56) References Cited

U.S. PATENT DOCUMENTS

| | | | |
|---|---|---|---|
| 2007/0230482 A1* | 10/2007 | Shim | H04L 12/42 370/400 |
| 2009/0282048 A1* | 11/2009 | Ransom | G06F 16/134 |
| 2017/0142068 A1* | 5/2017 | Devarajan | H04L 67/146 |
| 2018/0268228 A1* | 9/2018 | Okada | G06V 40/103 |
| 2019/0050541 A1* | 2/2019 | Wright | H04L 9/3252 |

(Continued)

FOREIGN PATENT DOCUMENTS

CN 111626307 * 9/2020

*Primary Examiner* — Taghi T Arani
*Assistant Examiner* — Lin Chang
(74) *Attorney, Agent, or Firm* — Weiss & Arons LLP

(57) ABSTRACT

Systems, methods and apparatus are provided for an end to end control automation workflow using a distributed network. The data segregation layer may assimilate data from a variety of enterprise sources. A trust engine may validate the data from enterprise sources against enterprise security standards. The system may use a distributed network to validate the data from the various sources and populate a distributed hash table. The distributed network may be a Holochain® framework. The system may include an automation layer that uses robotic processing automation scripts to validate data against a system of record and flag exceptions. The automation layer may provide data to a user interface layer. The user interface may include an interactive dashboard for presenting a range of detailed reports.

17 Claims, 3 Drawing Sheets

(56) References Cited

U.S. PATENT DOCUMENTS

| | | | |
|---|---|---|---|
| 2019/0141015 A1* | 5/2019 | Nellen | H04L 61/4511 |
| 2019/0236161 A1* | 8/2019 | Roy | G06F 3/0608 |
| 2019/0312888 A1* | 10/2019 | Grimm | H04L 63/02 |
| 2020/0073560 A1* | 3/2020 | Adanve | H04L 9/3239 |
| 2020/0137097 A1* | 4/2020 | Zimmermann | G06F 21/6218 |
| 2020/0389521 A1* | 12/2020 | Brock | H04L 67/108 |
| 2021/0135854 A1* | 5/2021 | Karame | H04L 9/3247 |
| 2022/0164374 A1* | 5/2022 | Herrera | G06F 7/02 |

\* cited by examiner

TRUSTED CONTROL AUTOMATION PLATFORM

FIELD OF TECHNOLOGY

Aspects of the disclosure relate to an end to end control automation workflow using a distributed network.

BACKGROUND OF THE DISCLOSURE

Business controls typically involve processes and procedures for regulating and protecting an organization. Automation of control functions is essential for faster fulfillment of business transactions, but may require complex protocols to prevent errors and protect against fraudulent activity.

Control automation requires assimilating data from various data sources such as emails, electronic document repositories, web sources and client profiles. Manual assessment of the data sources is error prone and vulnerable to fraudulent activity. Additionally, the data from some sources may not be cryptographically verified, making it difficult to assess authenticity.

It would be desirable to provide an end-to-end automated decision framework that cryptographically verifies the data and data sources prior to extraction and delivery of the data. It would be desirable to validate the data sources using an agent-based distributed network such as a Holochain® framework.

SUMMARY OF THE DISCLOSURE

Systems, methods and apparatus for a platform for an end to end control automation workflow using a distributed network are provided.

The platform may include a data segregation layer. The data segregation layer may assimilate data from one or more enterprise sources.

The data segregation layer may include a connector framework. The connector framework may access data from different enterprise sources. The connector framework may transmit the data to a trust engine for validation. The connector framework may maintain the validated data in a parallel array of distributed network nodes, each associated with an enterprise source.

A trust engine may validate the data against one or more enterprise standards. The trust engine may invoke one or more firewall rules to filter data that fails to meet the enterprise standards.

The platform may include a data extraction layer. The data extraction layer may access a distributed network node in the connector parallel array. The data extraction layer may validate the distributed network node based shared network rules. The data extraction layer may use one or more machine learning extraction algorithms to extract data and metadata stored cryptographically at the distributed network node. The data extraction layer may populate a distributed hash table with the extracted data and metadata.

The platform may include an automation layer. The automation layer may access data from the distributed hash table. The automation layer may apply robotic process automation to validate the data from distributed hash table against enterprise systems of records and flag exceptions for manual review. The automation layer may transmit exception data to the trust engine to update firewall rules.

The platform may include a user interface layer. The user interface layer may access validated data from the automation layer. The user interface layer may generate one or more reports. The user interface layer may display a user report via an interactive user interface.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
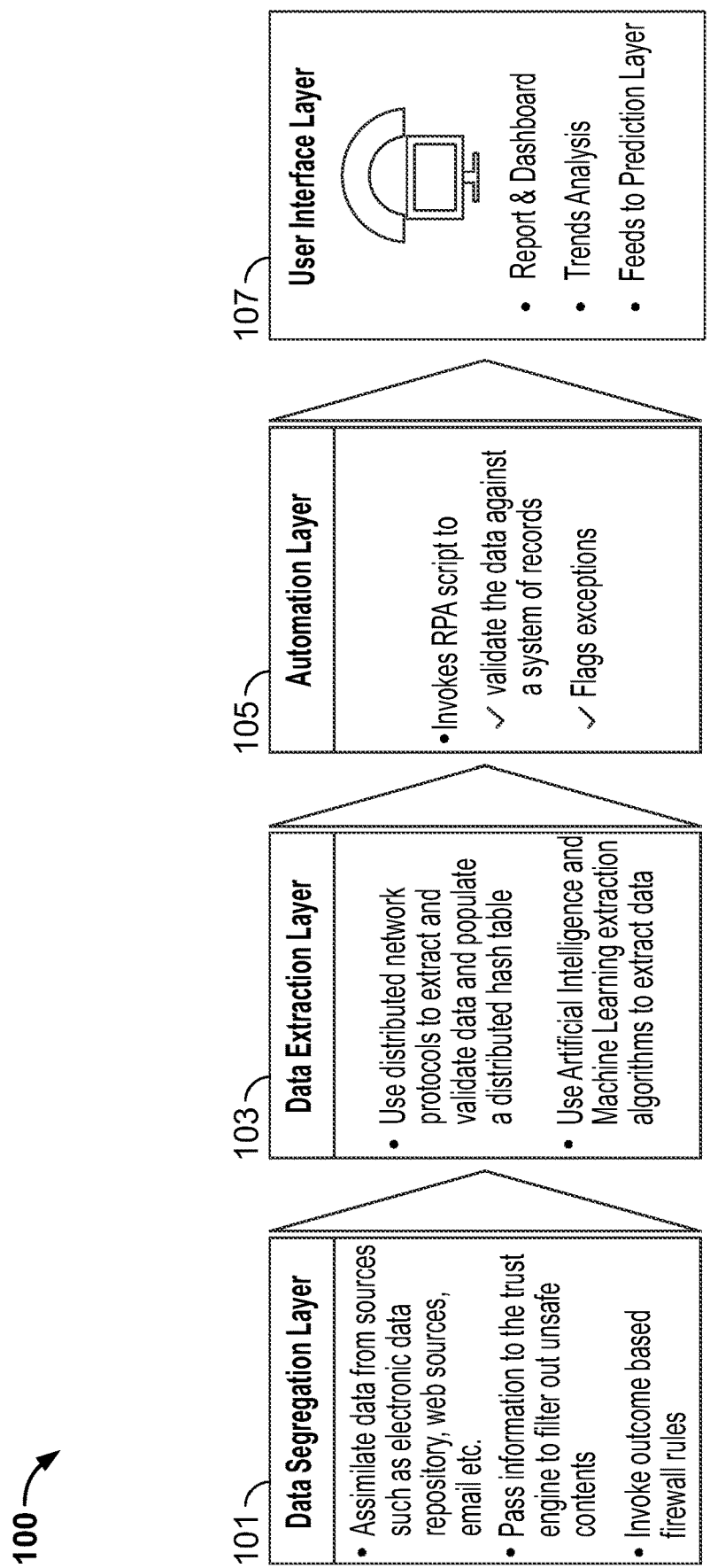
FIG. 1 shows illustrative system architecture in accordance with the principles of the disclosure.

Systems, methods and apparatus for a platform for an end to end control automation workflow using a distributed network are provided.

For the sake of illustration, the invention will be described as being performed by a "system." The system may include one or more features of the apparatus and methods that are described herein and/or any other suitable device or approach.

The system may include a data segregation layer. The data segregation layer may assimilate data from one or more enterprise sources. Illustrative enterprise sources include email, web sources, electronic data repositories, scanned documents, client profiles, and any other suitable sources.

The data segregation layer may include a connector framework. A connector framework enables streamlined access to the content of different external applications, directories, and databases. The connector framework may interact with each of the enterprise sources.

The connector framework may use adaptors to interact with the enterprise sources. Hardware or software adaptors may reconcile differences between incompatible applications so that data can be transmitted and received. The adapters may be configurable devices that read data and transmit data to other platform layers.

The data segregation layer may include a trust engine in communication with the connector framework. The connector framework may transmit data from the enterprise sources to the trust engine for validation. Traffic control software may regulate the transmission of data to the trust engine. The trust engine may use enterprise corporate security protocols to validate the data. The trust engine may invoke one or more firewall rules to filter data that fails to meet the enterprise standards. Unauthorized content may be blocked so it is not passed on to other platform layers.

After the enterprise source data has been validated by the trust engine, the connector framework may place the validated data in parallel enterprise source applications under connector authorship.

Each enterprise source application may function as a node in a distributed network. Each node may store data and transactions in a local chain that is cryptographically signed and indexed.

The system may include a data extraction layer. The data extraction layer may use distributed network protocols to extract and validate network data from the nodes and populate a distributed hash table (DHT).

The distributed network may be a Holochain® framework. The Holochain® framework may validate cryptographically stored data from a network node based on shared network rules.

Holochain® is an open source framework for developing fully distributed peer to peer applications. Holochain® differs from data-centric systems such as blockchain which enforce data consensus across the entire network. Holochain® is an agent-centric network in which each agent or node maintains its own cryptographically secured hashchain. Each new hashchain entry is signed with a private key.

Content from each application may be shared to a DHT. The DHT may validate the node using Holochain® validation rules and may then publish the data. Every authentic application on the Holochain® network will comply with the network validation rules.

Because each Holochain® node each maintain its own separate ledger and does not require consensus for each transaction, the computational speed is significantly faster than other decentralized network models. Holochain® networks may function without proof of work or proof of stake. The framework does not require advanced computing capacity and can run without a graphical processing unit or a physics processing unit.

The Holochain® framework may validate the authenticity of content from the network nodes using a variety of shared network rules. Illustrative rules include validating the content authenticity by using the cryptographic address of content to determine when the content originated or when the content was modified, the duration between document creation and modification, and whether the originator and modifier are from the same internet IP address. Holochain® rules may validate metadata including a memory check of documents, financial amounts, and format validation.

The data extraction layer may use one or more machine learning algorithms to extract content from the distributed network nodes. The data extraction layer may perform super resolution and OCR to extract document content from the authorized data. The technical stack for the data extraction layer may include named entity recognition to locate named documents mentioned in unstructured content and classify documents into predefined categories. The technical stack for the data extraction layer may include laplacian cascaded networks to increase the accuracy of optical character recognition and to improve image quality in a document. The technical stack may also maintain the Holochain® framework and the DHT rules configuration. The DHT rule configuration may be shared rules among the participating nodes for validation of a transaction or validation of data elements. The DHT rule configuration may use the hash value of the chain in order to validate the data.

The data extraction layer may include additional tools that improve processing effectiveness. A business lexicon may include operating procedures that are specific to each business function. Language context embedding may embed mathematical representations of language present in the enterprise sources. Image preprocessing utilities may be used to enhance the image quality of the content from the enterprise sources before the data is passed on to the machine learning extraction algorithms in the technical stack. Enterprise quality control standards are quality assurance standards defined by the business function operating procedures.

The system may include an automation layer. The automation layer may include additional governance protocols to identity data improperly validated by the Holochain® framework and override it using manual intelligence.

A cognitive bridge may release DHT data to the automation layer. The cognitive bridge may also provide quality assurance results to the trust engine to update firewall rules. In some embodiments quality assurance feedback may be used to modify rules on the Holochain® network.

The automation layer may apply robotic process automation (RPA) to validate the DHT against one or more enterprise systems of records. An RPA script may load the relevant data from the system of records and compare the data from the DHT. The RPA may flag exceptions for manual review.

The system may include a user interface layer. The user interface layer may access validated data from the automation layer. The user interface layer may organize and present validated data to the user. The user interface may include an interactive dashboard that enables the user to request reports based on the validated data. The user interface layer may display requested reports to the user via the interactive user interface.

The validated data may be applied to satisfy reporting requirements for reconciliation and audit. The validated control data may be applied to identify trends. A prediction layer may use the validated data for forecasting or any suitable business intelligence purpose. Business intelligence reports may include predictive analysis.

The system may include various hardware components. Such components may include a battery, a speaker, and antenna(s). The system may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may provide instructions, that when executed by the microprocessor, enable the system to perform various functions. For example, software may include an operating system, application programs, web browser and a database. Alternatively, some or all of computer executable instructions of the system may be embodied in hardware or firmware components of the system.

Application programs, which may be used by the system, may include computer-executable instructions for invoking user functionality related to communication, authentication services, and voice input and speech recognition applications. Application programs may utilize one or more algorithms that encrypt information, process received executable instructions, interact with enterprise systems, perform power management routines or other suitable tasks.

The system may operate in a networked environment. The system may support establishing communication channels with one or more enterprise systems. The system may connect to a local area network ("LAN"), a wide area network ("WAN") a cellular network or any suitable communication network. When used in a LAN networking environment, the system may be connected to the LAN through a network interface or adapter. When used in a WAN networking environment, the system may include a modem or other means for establishing communications over a WAN, such as the Internet. It will be appreciated that the existence of any of various well-known protocols such as TCP/IP, Ethernet, FTP, HTTP and the like is presumed.

The system may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The system may utilize computer-executable instructions, such as program modules, being executed by a computer. Generally, program modules include routines, programs, objects, components, data structures, etc. that perform particular tasks or implement particular abstract data types. The system may be operational with distributed computing environments where tasks are performed by remote processing devices that are linked through a communications network. In a distributed computing environment, program modules may be located in both local and remote computer storage media including memory storage devices.

A method for an end to end control automation workflow using a distributed network. The method may include assimilating data from one or more enterprise sources into a connector framework. The connector framework may use one or more adaptors to interact with the enterprise sources.

The method may include using a trust engine to validate data from an enterprise source against enterprise standards.

The method may include using a trust engine to invoke firewall rules to filter data that fails to meet the enterprise standards.

The method may include storing validated data from the trust engine in one or more cryptographic hash chains at an array of distributed network nodes, each network node associated with an enterprise source in the connector framework.

The method may include validating each network node based on shared rules for the distributed network.

The method may include extracting data and metadata from the network node using one or more machine learning extraction algorithms.

The method may include populating a distributed hash table with data and metadata extracted from a validated node.

The method may include using a Holochain® framework to validate cryptographically stored data from a network node based at least in part on a hash value associated with the data.

The method may include applying robotic process automation (RPA) for quality assurance. The method may include using RPA to validate the data from the distributed hash table against one or more enterprise systems of record and flag exceptions for manual review.

The method may include using a cognitive bridge. The cognitive bridge may be in communication with the trust engine. The cognitive bridge may use one or more machine learning updating algorithms to identify irrelevant data from the distributed hash table. The cognitive bridge may transmit feedback to the trust engine to update one or more firewall rules.

The method may include generating one or more reports from the validated data.

The method may include displaying a user report via an interactive user interface.

The method may include using validated data to generate a report for enterprise audit or reconciliation.

The method may include using validated data to generate a business intelligence report containing predictive analytics.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

FIG. 1 shows illustrative system architecture 100 for an end to end control automation workflow using a distributed network.

Data Segregation Layer 101 assimilates data from enterprise sources, such as electronic data repositories, web sources and email. Data Segregation Layer 101 may use a connector framework and adaptors to interact with the data and transmit the data on to other layers. Data from enterprise sources is transmitted to the trust engine to validate the data against one or more enterprise standards. The trust engine may invoke one or more firewall rules to filter data that fails to meet one of the enterprise standards. The trust engine may filter out unsafe contents of the data. After the data has been validated by the trust engine the connector framework may place the validated data in nodes in a distributed network.

Data Extraction Layer 103 uses distributed network protocols to extract and validate data from the network nodes and populate a distributed hash table (DHT). Data Extraction Layer 103 uses artificial intelligence and machine learning algorithms to extract the data and populate a distributed hash table with the extracted content.

Automation Layer 105 may apply robotic process automation (RPA) to validate the distributed hash table against one or more enterprise systems of record. The RPA may flag exceptions for manual review. Automation Layer 105 may use RPA to load the data in a system of records.

User Interface Layer 107 may access validated data from Automation Layer 105. User Interface Layer 107 may organize and present validated data to the user. User Interface Layer 107 may include an interactive dashboard that enables the user to request reports based on the validated data. The reports may include enterprise audit or reconciliation reports. The reports may include business intelligence reports that includes predictive analytics.

Figure 2:
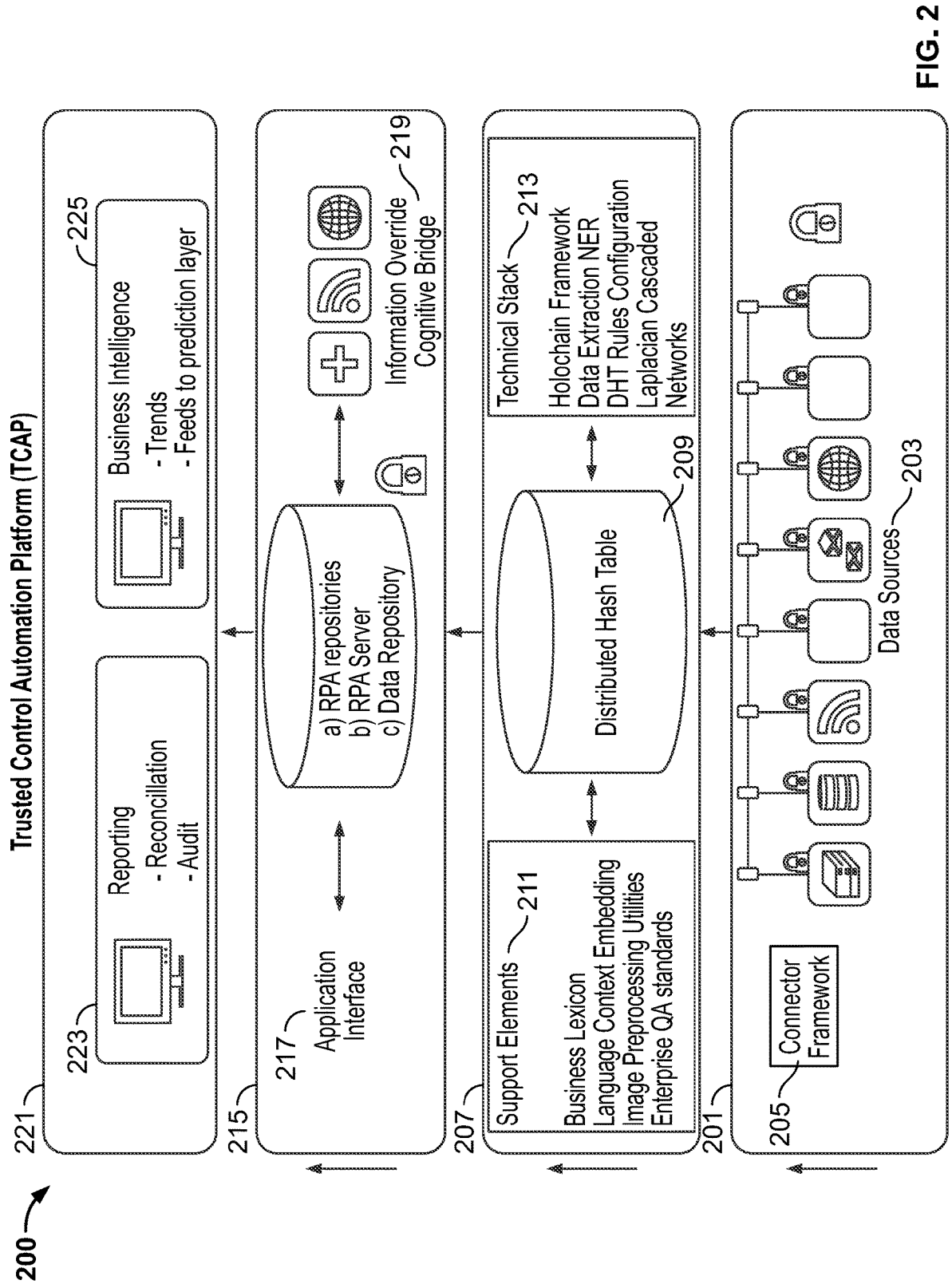
FIG. 2 shows a hybrid architecture/process flow in accordance with the principles of the disclosure.

FIG. 2 shows a hybrid architecture/process flow 200 for an end to end control automation workflow using a distributed network.

Data Segregation Layer 201 assimilates data from Data Sources 203. Data Segregation Layer 201 uses a Connector Framework 205 and adaptors to assimilate the data and pass the data on to other layers. Connector Framework 205 maintains the data in a parallel array of one or more distributed network nodes, each network node associated with each Data Source.

Data Extraction Layer 207 extracts the data from the network nodes. Using the Supporting Elements 211 and the machine learning extraction algorithms in Technical Stack 213, Data Extraction Layer 207 populates Distributed Hash Table 209.

Supporting Elements 211 include a Business Lexicon. The Business Lexicon includes operating procedures that are specific to each business function. Supporting Elements 211 includes Language Context Embedding. Language Context Embedding may embed mathematical representations of language present in Data Sources 203. Supporting Elements 211 include Image Preprocessing Utilities to enhance the image quality of Data Sources 203 before the data is passed on to the machine learning extraction algorithms in Technical Stack 213. Supporting Elements 211 include Enterprise Quality Control (QA) Standards. Enterprise Quality Control Standards are quality assurance standards defined by the business function operating procedures.

The applications in Technical Stack 213 include a Holochain® Framework. The Holochain® Framework validates cryptographically stored data from a network node. The tools in Technical Stack 213 include Data Extraction Named Entity Recognition (NER). Data Extraction NER is a machine learning algorithm to locate named documents mentioned in unstructured content and classify them in predefined categories. The tools in Technical Stack 213 include Distributed Hash Table (DHT) Rules Configuration. DHT Rules Configuration includes shared network rules for validation of the content. The tools in Technical Stack 213 include Laplacian Cascaded Networks. Laplacian Cascaded Networks are neural networks used to improve the accuracy of optical character recognition, thereby increasing the image quality of the documents.

Automation Layer 215 accesses data from Distributed Hash Table 209. Automation Layer 215 applies robotic process automation (RPA) to validate the distributed hash table against one or more enterprise systems of record and flag exceptions for manual review. Automation Layer 215 may include repositories of RPA scripts. Automation Layer 215 may include an RPA server.

Cognitive Bridge 219 is an intelligent subunit in communication with Automation Layer 215. Cognitive Bridge 219 may use one or more machine learning updating algorithms to evaluate data from the Distributed Hash Table 209. Cognitive Bridge may transmit quality control feedback to the trust engine to update one or more firewall rules.

User Interface Layer 221 accesses validated data from Automation Layer 215. User Interface Layer 221 generates reports 223 for reconciliation or audit. User Interface Layer 221 may be used to display business intelligence reports 225 regarding trends or predictions.

Figure 3:
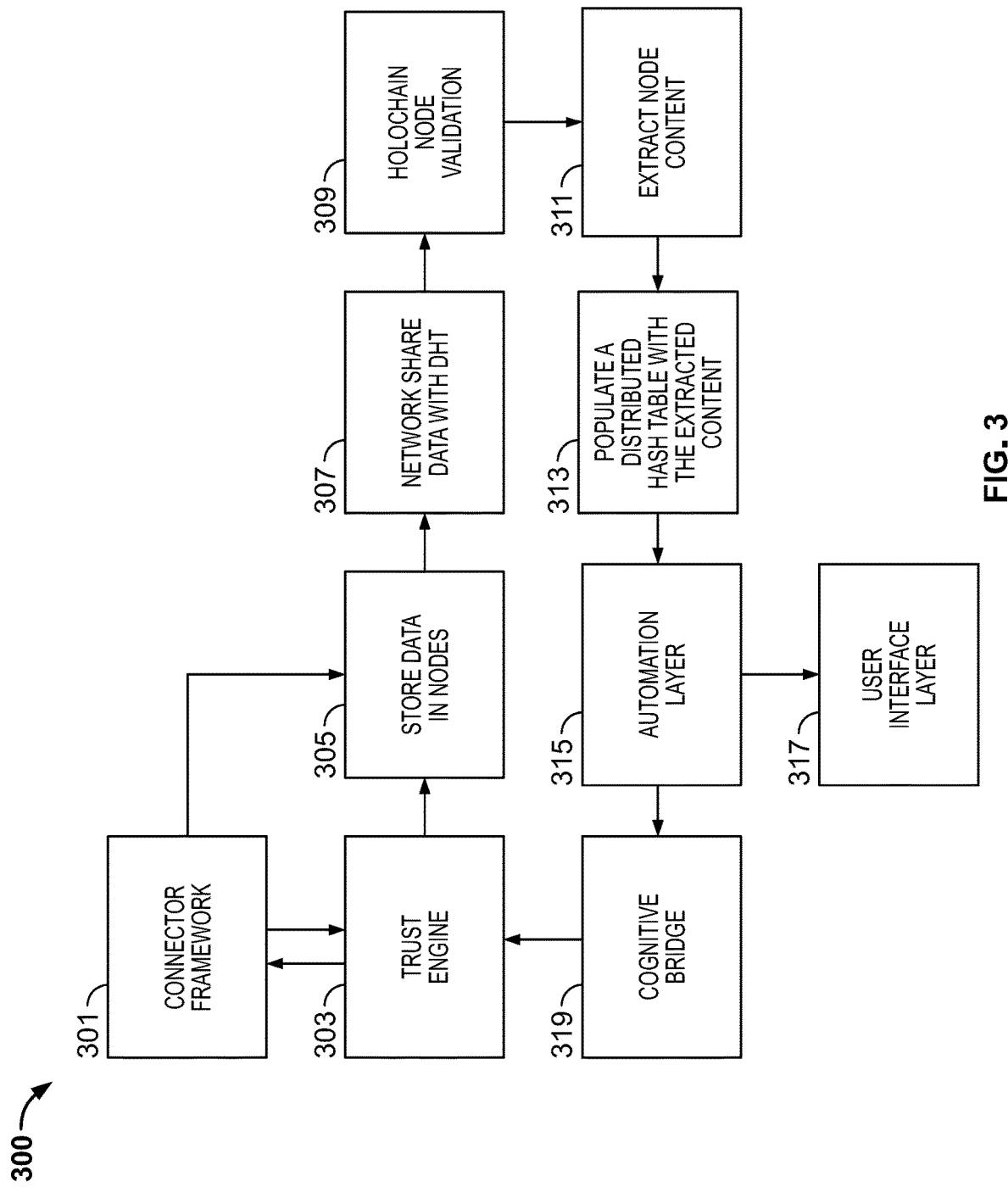
FIG. 3 shows hybrid architecture/process flow in accordance with the principles of the disclosure.

FIG. 3 shows a hybrid architecture/process flow 300 for an end to end control automation workflow using a distributed network.

Data from Connector Framework 301 is sent to the Trust Engine 303. Trust Engine 303 validates the data against one or more enterprise standards. Trust Engine 303 may invoke one or more firewall rules to filter data that fails to meet one of the enterprise standards.

At step 305, the validated data is stored in one or more cryptographic hash chains at an array of distributed network nodes, each node associated with an enterprise source in the connector framework.

At step 307, the network shares data with the Distributed Hash Table (DHT).

At step 309, the distributed network uses a Holochain® framework to validate cryptographically stored data from a network node based at least in part on a hash value associated with the data.

At step 311, using one or more machine learning algorithms, content stored cryptographically at the distributed network node is extracted.

At step 313, a distributed hash table is populated with the extracted content.

At step 314, Automation Layer accesses data from the distributed hash table 313 and applies robotic process automation to validate the distributed hash table data against one or more enterprise systems of record and flag exceptions for manual review.

At step 319, a Cognitive Bridge is in communication with the Trust Engine 303 and Automation Layer 314. Cognitive Bridge 319 uses one or more machine learning updating algorithms to identify irrelevant data from the distributed hash table and transmits feedback to Trust Engine 303. Trust Engine 303 may update the firewall rules based on the feedback.

User Interface Layer 317 accesses the validated data from the automation layer. User Interface Layer 317 may generate one or more reports and display a user report via an interactive user interface.

Thus, systems, methods and apparatus for a TRUSTED CONTROL AUTOMATION PLATFORM are provided. Persons skilled in the art will appreciate that the present invention can be practiced by other than the described embodiments, which are presented for purposes of illustration rather than of limitation, and that the present invention is limited only by the claims that follow.

What is claimed is:

1. A computer system for an end-to-end control automation workflow via an agent-centric distributed network, the distributed network validating authenticity of one or more distributed network nodes each comprising a locally encrypted hash chain, the distributed network operating in conjunction with quality assurance protocols using robotic process automation and machine-learning based modification of trust engine firewall rules, the computer system comprising:

a data segregation protocol connected via the distributed network to assimilate data from one or more enterprise sources, the data segregation protocol comprising:
a connector logic configured to:
access data from the enterprise source;
transmit the data from the enterprise source to a trust engine for validation; and
maintain the validated data in a parallel array of the one or more distributed network nodes, each distributed network node associated with each enterprise source of the one or more enterprise sources;
the trust engine connected via the distributed network to the connector logic and that validates the data from the one or more enterprise sources against one or more enterprise standards and invokes one or more firewall rules to filter data that fails to meet one of the one or more enterprise standards;
a data extraction protocol connected via the distributed network to access a distributed network node in the parallel array, to validate the distributed network node in the parallel array based on one or more shared network rules; using one or more machine learning extraction algorithms, to extract data and metadata stored cryptographically at the distributed network node in the parallel array, and to populate a distributed hash table with the extracted data and metadata;
an automation protocol connected via the distributed network to access data from the distributed hash table, to apply robotic process automation to validate the distributed hash table data against one or more enterprise systems of records and flag exceptions for manual review and to transmit exception data to the trust engine to update firewall rules;
a user interface connected via the distributed network to access validated data from the automation, generate one or more reports and to display a user report via an interactive user interface; and
a cognitive bridge in communication with the trust engine and the automation protocol, is configured to:
using one or more machine learning updating algorithms, identify irrelevant data from the distributed hash table;
transmit feedback to the trust engine to update one or more firewall rules; and
release distributed hash table data to the automation protocol.

2. The computer system of claim 1 wherein the data extraction protocol comprises a Holochain® framework configured to validate cryptographically stored data from the distributed network node in the parallel array based at least in part on a hash value associated with the data from the one or more enterprise sources.

3. The computer system of claim 1 wherein the connector logic is configured to use one or more adaptors to interact with the one or more enterprise sources.

4. The computer system of claim 1 wherein the data extraction protocol uses named entity recognition to locate named documents mentioned in unstructured content and classify the documents into predefined categories.

5. The computer system of claim 1 wherein the data extraction protocol increases accuracy of optical character recognition using laplacian cascaded networks to improve image quality in a document.

6. The computer system of claim 1 wherein the user interface is configured to use validated data from the automation protocol to generate an enterprise audit or reconciliation report.

7. The computer system of claim 1 wherein the user interface is configured to use validated data from the automation protocol to generate a business intelligence report comprising predictive analytics.

8. A method for an end-to-end control automation workflow via an agent-centric distributed network, the distributed network validating authenticity of one or more network nodes each comprising a locally encrypted hash chain, the distributed network operating in conjunction with quality assurance protocols using robotic process automation and machine-learning based modification of trust engine firewall rules, the method comprising:
assimilating data, using the distributed network, from one or more enterprise sources into a connector logic;
using a trust engine:
validating data from the one or more enterprise source against one or more enterprise standards; and
invoking, using the distributed network, one or more firewall rules to filter data that fails to meet the enterprise standards;
storing, using the distributed network, validated data by the trust engine in one or more cryptographic hash chains at a parallel array of distributed network nodes, each distributed network node in the parallel array associated with each of the one or more enterprise sources in the connector logic;
validating, using the distributed network, each distributed network node in the parallel array based on shared rules for the distributed network;
extracting, using the distributed network, data and metadata from the distributed network node in the parallel array using one or more machine learning extraction algorithms;
populating, using the distributed network, a distributed hash table with data and metadata extracted from a validated network node;
applying, using the distributed network, robotic process automation (RPA) for quality assurance, the RPA configured to validate the data from the distributed hash table against one or more enterprise systems of records and flag exceptions for manual review;
generating one or more reports from the validated data;
displaying a user report via an interactive user interface; and
using a cognitive bridge, the cognitive bridge, in communication with the trust engine and the automation protocol, to:
use one or more machine learning updating algorithms to identify irrelevant data from the distributed hash table;
transmit feedback to the trust engine to update one or more firewall rules; and
release distributed hash table data to the automation protocol.

9. The method of claim 8 wherein the distributed network uses a Holochain® logic to validate cryptographically stored data from the distributed network node in the parallel array based at least in part on a hash value associated with the data from the one or more enterprise sources.

10. The method of claim 8 wherein the connector logic is configured to use one or more adaptors to interact with the one or more enterprise sources.

11. The method of claim 8 further comprising using validated data to generate a report for enterprise audit or reconciliation.

12. The method of claim 8 further comprising using validated data to generate a business intelligence report comprising predictive analytics.

13. One or more non-transitory computer-readable media storing computer-executable instructions which, when executed by a processor on a computer system, perform a method for an end-to-end control automation workflow via an agent-centric distributed network, the distributed network validating authenticity of one or more network nodes each comprising a locally encrypted hash chain, the distributed network operating in conjunction with quality assurance protocols using robotic process automation and machine-learning based modification of trust engine firewall rules, the method comprising:
assimilating data, using the distributed network, from one or more enterprise sources into a connector logic;

using a trust engine:
  validating, using the distributed network, the data from the one or more enterprise source sources against one or more enterprise standards; and
  invoking, using the distributed network, one or more firewall rules to filter data that fails to meet the one or more enterprise standards;
storing, using the distributed network, validated data from the trust engine in one or more cryptographic hashchains at a parallel array of distributed network nodes, each network node in the parallel array associated with each enterprise source of the one or more enterprise sources in the connector logic;
validating, using the distributed network, each distributed network node in the parallel array based on shared rules for the distributed network;
extracting, using the distributed network, data and metadata from a distributed network node in the parallel array using one or more machine learning extraction algorithms;
populating, using the distributed network, a distributed hash table with data and metadata extracted from a validated network node;
applying, using the distributed network, robotic process automation (RPA) for quality assurance, the RPA configured to validate the data from the distributed hash table against one or more enterprise systems of records and flag exceptions for manual review;
generating one or more user reports from the validated data;
displaying a user report via an interactive user interface; and
using a cognitive bridge, the cognitive bridge, in communication with the trust engine and the automation protocol, to:
  use one or more machine learning updating algorithms to identify irrelevant data from the distributed hash table;
  transmit feedback to the trust engine to update one or more firewall rules; and
  release distributed hash table data to the automation protocol.

14. The media of claim 13 wherein the distributed network uses a Holochain® logic to validate cryptographically stored data from each distributed network node in the parallel array based at least in part on a hash value associated with the data from the one or more enterprise sources.

15. The media of claim 13 wherein the connector logic is configured to use one or more adaptors to interact with the one or more enterprise sources.

16. The media of claim 13 further comprising using validated data to generate a report for enterprise audit or reconciliation.

17. The media of claim 13 further comprising using validated data to generate a business intelligence report comprising predictive analytics.

* * * * *